United States Patent
Malone et al.

(10) Patent No.: US 8,849,487 B2
(45) Date of Patent: Sep. 30, 2014

(54) UTILIZATION OF VEHICLE PORTAL STATES TO ASSESS INTERIOR COMFORT AND ADJUST VEHICLE OPERATION TO PROVIDE ADDITIONAL FUEL ECONOMY

(75) Inventors: Mark Douglas Malone, Canton, MI (US); Tuan Anh Be, Livonia, MI (US); Hafiz Shafeek Khafagy, Dearborn, MI (US); William Najib Mansur, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 103 days.

(21) Appl. No.: 13/491,284

(22) Filed: Jun. 7, 2012

(65) Prior Publication Data

US 2013/0332013 A1    Dec. 12, 2013

(51) Int. Cl.
*B60H 1/00*    (2006.01)

(52) U.S. Cl.
CPC ............ *B60H 1/004* (2013.01); *B60H 1/00764* (2013.01)
USPC ................ 701/22; 701/36; 165/202; 165/203

(58) Field of Classification Search
CPC ...................... B60H 1/00764; B60H 1/00785
See application file for complete search history.

(56) References Cited

U.S. PATENT DOCUMENTS

| 6,909,947 | B2 * | 6/2005 | Douros et al. ................ 701/34.4 |
| 7,007,856 | B2 * | 3/2006 | La Falce et al. ......... 237/12.3 B |
| 7,102,501 | B2 * | 9/2006 | Lo Presti et al. .............. 340/501 |
| 7,441,414 | B2 | 10/2008 | Ziehr et al. |
| 2006/0144581 | A1 * | 7/2006 | Kauf ............................. 165/202 |
| 2006/0225450 | A1 | 10/2006 | Dage et al. |
| 2008/0147270 | A1 | 6/2008 | Sakane et al. |
| 2010/0236770 | A1 | 9/2010 | Pursifull |

* cited by examiner

*Primary Examiner* — John R Olszewski
*Assistant Examiner* — Todd Melton
(74) *Attorney, Agent, or Firm* — Julia Voutyras; Alleman Hall McCoy Russell & Tuttle LLP

(57) ABSTRACT

A method of operating a heating, ventilation and air-conditioning system of a plug-in hybrid electric vehicle, comprising during a first engine-running condition, where a vehicle window or vent is in a more closed position, operating a climate control system to provide a user requested level of thermal comfort, and during a second engine-running condition, wherein the vehicle window or vent is in a less closed position, limiting the performance of the climate control system and biasing shared vehicle resources to provide additional fuel economy. In this manner, thermal comfort of the vehicle passengers can be maintained while providing additional fuel economy.

16 Claims, 6 Drawing Sheets

UTILIZATION OF VEHICLE PORTAL STATES TO ASSESS INTERIOR COMFORT AND ADJUST VEHICLE OPERATION TO PROVIDE ADDITIONAL FUEL ECONOMY

BACKGROUND AND SUMMARY

Traditional vehicle climate control strategies utilize engine operation to support continuous or nearly continuous heating, ventilation and air-conditioning (HVAC) operation. With systems that reduce engine operation, such as stop-start enabled powertrains and/or hybrid electric powertrains, engine power is less available to support the climate control system. For example, stop-start enabled powertrains may stop the engine while the vehicle is motionless or at cruising speed. Hybrid electric powertrains may stop the engine under an even broader set of operating scenarios. When the engine is stopped, it may be difficult to employ traditional climate control strategies with the HVAC system operated at full performance continuously to provide optimal interior comfort.

Dage et al. (US 2006/0225450 A1) discloses a hybrid-electric vehicle automatic climate control strategy wherein the engine and air-conditioning (A/C) compressor are stopped if the vehicle is idling or stopped, the A/C compressor is stopped if not needed to maintain user comfort when the vehicle is being driven, and the A/C compressor is stopped in defogging mode if it is no longer needed to eliminate fogging. User comfort is assessed based on user selection of one of four comfort modes, each mode corresponding to a set of HVAC operating setpoints and/or thresholds based largely on temperature and relative humidity sensors. Similarly fogging probability is assessed based on relative humidity measurements.

The inventor herein has recognized a potential issue with the above approach. Namely, that other factors affecting user comfort and HVAC operation, such as open windows, vents, or blower state, can significantly affect the system operation and driver comfort. For example, if the ambient temperature is lower than the vehicle cabin temperature, opening the window or vent to allow ingress of ambient air can be sufficient for cooling the vehicle interior, instead of cycling the engine and/or A/C compressor on and off. Furthermore, there are vehicle operating conditions under which turning the engine and/or A/C compressor off is untenable for maintaining vehicle operating conditions and/or a desired level of comfort for the user. Under such circumstances however, more moderate actions such as lowering engine speed or torque or reducing compressor load can instead be effected in order to provide gains in fuel economy.

One approach that the inventor has taken to at least partially address the aforementioned issues is a method, comprising during a first engine-running condition, where a vehicle window or vent is in a more closed position, operating a climate control system to provide a user requested level of thermal comfort. During a second engine-running condition, where the vehicle window or vent is in a less closed position, the method further comprises limiting the climate control system performance.

In this way, it is possible to take advantage of the vehicle states, such as the window or vent states as set by the vehicle operator, to better control operation of the climate-control system. For example, the climate-control system operation may be limited, for example by reducing compressor or blower speed, thereby conserving energy when possible, without degrading operator comfort.

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
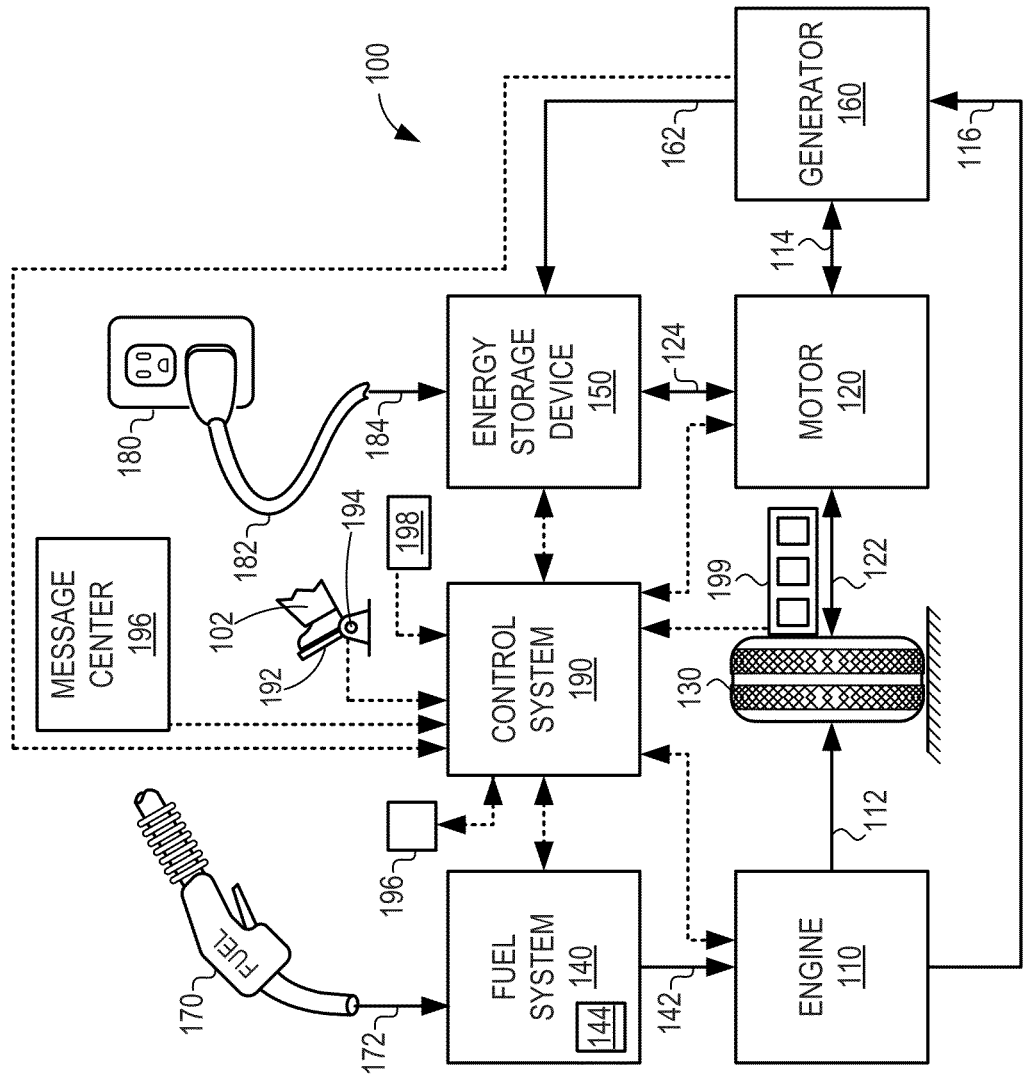
FIG. 1 illustrates an example vehicle.
Figure 2:
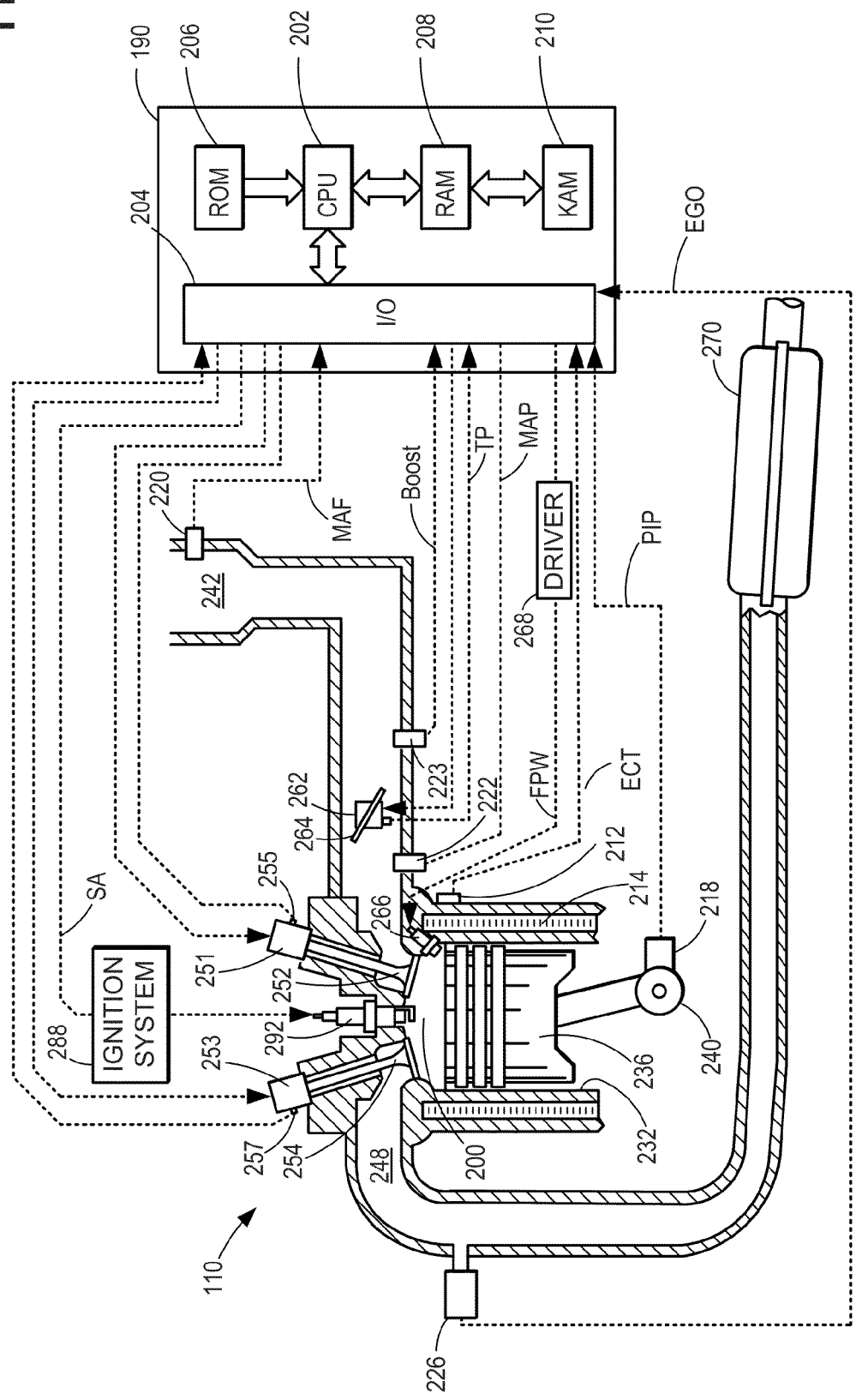
FIG. 2 illustrates an example internal combustion engine.
Figure 3:
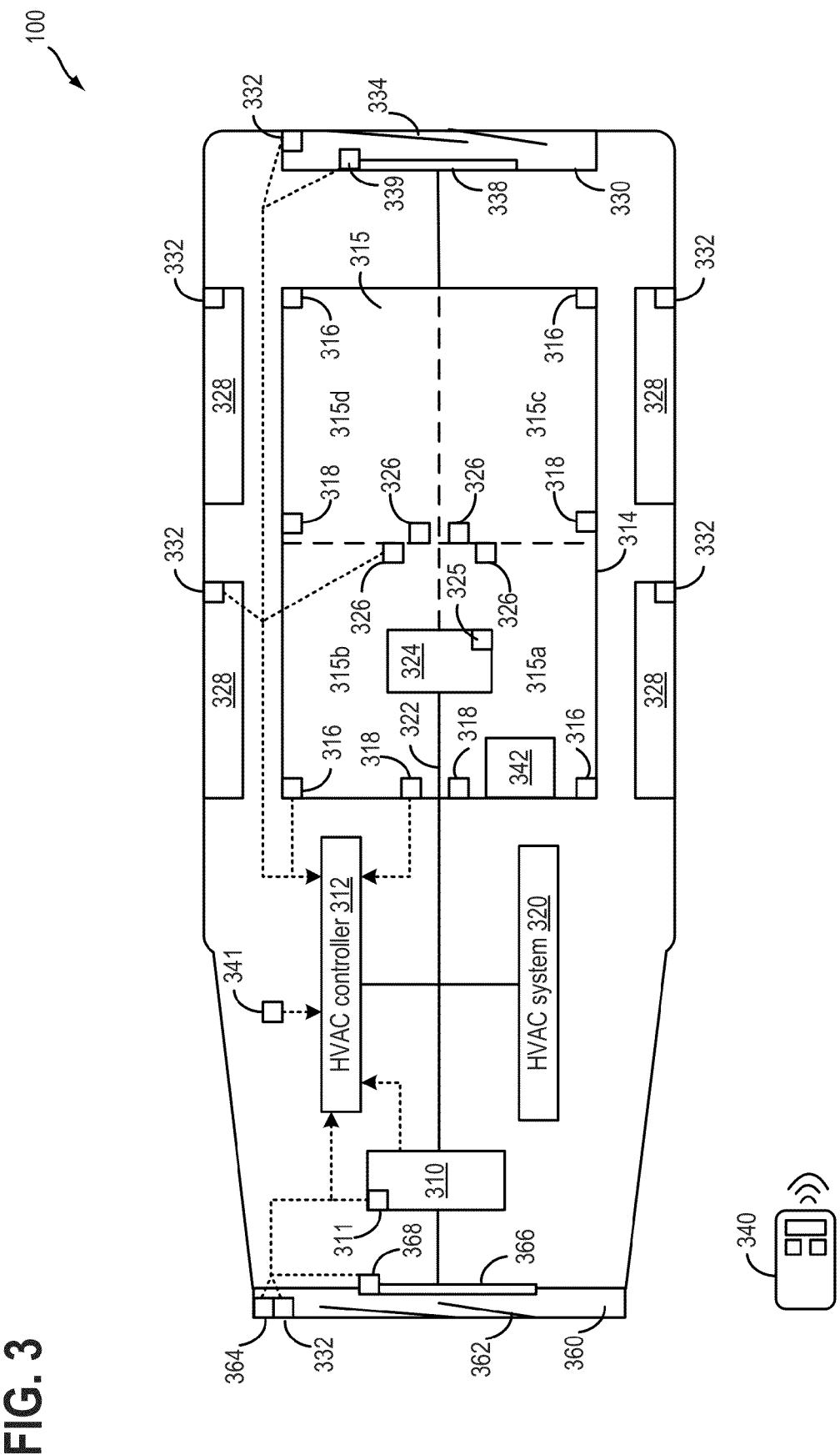
FIG. 3 illustrates a schematic view of a vehicle configured with an HVAC system.
Figure 4:
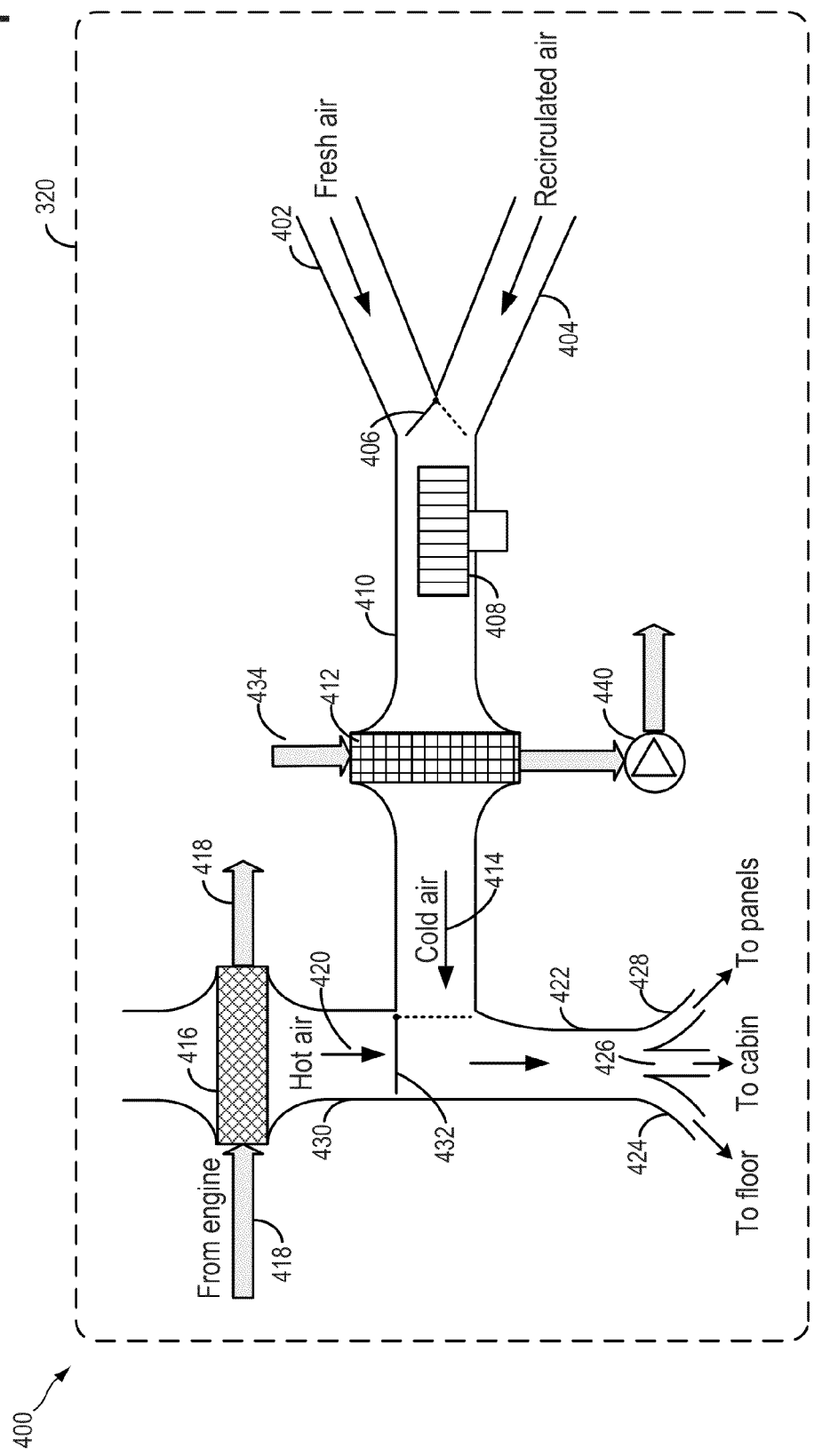
FIG. 4 illustrates an example embodiment of the HVAC system of FIG. 3
FIGS. 5-6 illustrate example routines.

The following description relates to systems and methods for a plug-in hybrid vehicle, such as shown in FIG. 1, including an internal combustion engine, such as shown in FIG. 2, and a vehicle HVAC system, such as depicted in FIGS. 3 and 4, to provide enhanced thermal comfort to vehicle occupants. An HVAC controller may be configured to adjust operation of the HVAC system and engine modes in coordination with a heuristic set of rules based on vehicle window and vent states using a control routine, such as illustrated in the example embodiments of FIGS. 5 and 6.

FIG. 1 illustrates an example vehicle 100. Vehicle 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle 100 may be referred to as a hybrid electric vehicle (HEV).

Vehicle 100 may utilize a variety of different operational modes depending on operating conditions encountered by the vehicle. Some of these modes may enable engine 110 to be maintained in an off state (e.g. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150 such as a battery. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle system. Note that in some embodiments, motor 120 may propel the vehicle via a first set of drive wheels and engine 110 may propel the vehicle via a second set of drive wheels.

In other embodiments, vehicle 100 may be configured as a series type vehicle, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

As will be described further below, the vehicle may be configured to transition between two or more of the operating modes described above depending on operating conditions. For instance, under driving conditions such as climbing steep hills, or driving on bumpy roads, where higher torque or power levels are needed, the vehicle may transition to engine only operation, or the vehicle may be propelled by both the engine 110 and the motor 120. Alternately, when the vehicle is traveling down a hill, or driving at low speeds on congested city streets, the vehicle may transition solely to being propelled by the electric motor 120.

Fuel system 140 may include one or more fuel storage tanks 144 for storing fuel on-board the vehicle, the fuel including but not limited to: gasoline, diesel, and alcohol fuels. In some examples, the fuel may be stored on-board the vehicle as a blend of two or more different fuels, whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Vehicle control system 190 may communicate with and may receive sensory feedback from one or more of engine 110, motor 120, fuel system 140, energy storage device 150, and generator 160. Further, vehicle control system 190 may send control signals to one or more of engine 110, motor 120, fuel system 140, energy storage device 150, and generator 160 responsive to this sensory feedback. Vehicle control system 190 may receive an indication of an operator requested output of the vehicle from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle is operated to propel the vehicle, electrical transmission cable 182 may be disconnected between power source 180 and energy storage device 150. Vehicle control system 190 may identify and/or control the amount of electrical energy stored at the energy storage device, which may be referred to as the state of charge (state-of-charge).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion.

This plug-in hybrid electric vehicle, as described with reference to vehicle 100, may be configured to utilize a secondary form of energy (e.g. electrical energy) that is periodically received from an energy source that is not otherwise part of the vehicle.

The vehicle 100 may also include a message center 196, ambient outdoor temperature/humidity sensor 198, and a roll stability control sensor, such as a lateral and/or longitudinal and/or yaw rate sensor(s) 199. The message center may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, etc. In an alternative embodiment, the message center may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 illustrates a non-limiting example of a cylinder 200 of engine 110, including the intake and exhaust system components that interface with the cylinder. Note that cylinder 200 may correspond to one of a plurality of engine cylinders. Cylinder 200 is at least partially defined by combustion chamber walls 232 and piston 236. Piston 236 may be coupled to a crankshaft 240 via a connecting rod, along with other pistons of the engine. Crankshaft 240 may be operatively coupled with drive wheel 130, motor 120 or generator 160 via a transmission.

Cylinder 200 may receive intake air via an intake passage 242. Intake passage 242 may also communicate with other cylinders of engine 110. Intake passage 242 may include a throttle 262 including a throttle plate 264 that may be adjusted by control system 190 to vary the flow of intake air that is provided to the engine cylinders. Cylinder 200 can communicate with intake passage 242 via one or more intake valves 252. Cylinder 200 may exhaust products of combustion via an exhaust passage 248. Cylinder 200 can communicate with exhaust passage 248 via one or more exhaust valves 254.

In some embodiments, cylinder 200 may optionally include a spark plug 292, which may be actuated by an ignition system 288. A fuel injector 266 may be provided in the cylinder to deliver fuel directly thereto. However, in other embodiments, the fuel injector may be arranged within intake passage 242 upstream of intake valve 252. Fuel injector 266 may be actuated by a driver 268.

A non-limiting example of vehicle control system 190 is depicted schematically in FIG. 2. Vehicle control system 190 may include a processing subsystem (CPU) 202, which may include one or more processors. CPU 202 may communicate with memory, including one or more of read-only memory (ROM) 206, random-access memory (RAM) 208, and keep-alive memory (KAM) 210. As a non-limiting example, this memory may store instructions that are executable by the processing subsystem. The process flows, functionality, and methods described herein may be represented as instructions stored at the memory of the vehicle control system 190 that may be executed by the processing subsystem.

CPU 202 can communicate with various sensors and actuators of engine 110 via an input/output device 204. As a non-limiting example, these sensors may provide sensory feedback in the form of operating condition information to the control system, and may include: an indication of mass airflow (MAF) through intake passage 242 via sensor 220, an indication of manifold air pressure (MAP) via sensor 222, an indication of throttle position (TP) via throttle 262, an indication of engine coolant temperature (ECT) via sensor 212 which may communicate with coolant passage 214, an indication of engine speed (PIP) via sensor 218, an indication of exhaust gas oxygen content (EGO) via exhaust gas composition sensor 226, an indication of intake valve position via sensor 255, and an indication of exhaust valve position via sensor 257, among others.

Furthermore, the vehicle control system 190 may control operation of the engine 110, including cylinder 200 via one or more of the following actuators: driver 268 to vary fuel injection timing and quantity, ignition system 288 to vary spark timing and energy, intake valve actuator 251 to vary intake valve timing, exhaust valve actuator 253 to vary exhaust valve timing, and throttle 262 to vary the position of throttle plate 264, among others. Note that intake and exhaust valve actuators 251 and 253 may include electromagnetic valve actuators (EVA) and/or cam-follower based actuators.

FIG. 3 shows a schematic depiction of a vehicle 100 equipped with an HVAC system 320. The vehicle may include a cabin space 314. The cabin space may be divided into occupancy zones 315. In one example, vehicle 100 may be a four-passenger vehicle. Accordingly, cabin space 314 may be divided into four occupancy zones including a front left side driver zone 315*a*, a front right side passenger zone 315*b*, a rear left side passenger zone 315*c*, and a rear right side passenger zone 315*d*. Each occupancy zone may be equipped with an occupancy sensor 316. In one example, occupancy sensor 316 may be a safety belt sensor configured to correlate the occupancy of the passenger zone with the fastening of the safety belt. Alternatively, other suitable occupancy sensors may be used.

HVAC system 320 may be configured to provide a climate-controlled air flow to cabin space 314 through ducting 322 and one or a plurality of vents 324. While the depicted example shows a common vent for the entire cabin space, it will be appreciated that in alternate embodiments, each occupancy zone may be serviced by distinct vents to enable each passenger to control the climate (for example, the temperature) of their occupancy zone. HVAC system 320 may additionally provide a climate-controlled air flow to the vehicle floors and panels through appropriate ducting. Vent 324 may also comprise vent sensor 325, which can provide HVAC controller 312, for example, with an input indication of the blower motor speed, the direction of air flow from the vent, and the duration of time and the degree the vent is open.

Cabin space 314 may be equipped with a temperature sensor 318 to provide feedback to an HVAC controller 312 regarding the temperature conditions in the cabin space. In one example, temperature sensor 318 may be a temperature sensor providing feedback regarding the average ambient temperature of the cabin space. In another example, each occupancy zone may be equipped with a distinct temperature sensor 318 to provide feedback to HVAC controller 312 regarding the temperature conditions within each occupancy zone. Alternatively, the signal provided from the distinct temperature sensors 318 may be combined and arranged in HVAC controller 312 to provide a control input signal representative of the ambient temperature of the cabin space 314.

Cabin space 314 may also be equipped with sun load sensor 326 to provide a signal indicative of the solar load received from each window of a respective occupancy zone 315 to HVAC controller 312. The vehicle 100 may additionally be equipped with fore and aft sun load sensors on the sun/moon roof or front and back windows of the vehicle. The signal provided from the sun load sensors 326 may be combined and arranged in HVAC controller 312 to provide a control input signal representative of the solar radiation intensity on the vehicle interior. Alternatively, the signals from the distinct sun load sensors may be used individually as a control input signal representative of the solar radiation intensity of each occupancy zone 315. Alternatively, the fore and/or aft sun load sensor may be used to provide a combined or individual solar intensity signal to the HVAC controller 312.

The vehicle 100 may be configured with four side windows 328, each included as an element of four vehicle doors. In alternate embodiments, the vehicle may be configured with two windows, each included as an element of two vehicle doors. Additionally, the vehicle 100 may include a rear window 330 that may be part of a rear vehicle door, and a roof window 350, for example a sunroof or moon roof. The roof window may also comprise a convertible top, for example, a soft top, a jeep-style removable canvas, a hard top or a t-roof. The rear vehicle window may also comprise a hatch, or larger portals such as a bus door, no door (for example, as in some delivery vehicles), portals with no window panes, and the like.

Each vehicle window 328, rear window 330, and roof window 350 may include a window sensor 332 configured to provide an indication to the HVAC controller 312 of the closed or open position of the window. Window sensors 332 may represent one or a plurality of sensors at each window further configured to provide an indication of the open state of the window. For example, window sensor 332 can measure the temperature and relative humidity at the interior window surface, and can indicate a percentage of full-open state and/or the time elapsed since the window was opened. In addition to rear window 330, vehicle 100 can further include rear window wipers 334, rear window defroster 336, rear window vent 338, and rear window vent sensor 339. Window sensor 332, rear window defroster 336, rear window vent 338 and rear window vent sensor 339 may provide inputs to the HVAC controller 312. Rear windshield vent sensor 339, can provide HVAC controller 312 with an input indication, for example, of the blower speed and the duration of time and the degree the rear windshield vent 338 is open.

Continuing with FIG. 3, vehicle 100 may further include a front window or windshield 360, front windshield wipers 362, front windshield wiper sensor 364, front windshield vent 366 and vent sensor 368, and front windshield window sensor 332. Window sensor 332, front windshield wiper sensor 364, front windshield vent sensor 368 may provide inputs to the HVAC controller 312. Front windshield vent sensor 368, can provide HVAC controller 312 with an input indication, for example, of the fan speed and the duration of time and the degree the vent is open.

Additional sensors, such as an indoor cabin relative humidity sensor, an altitude sensor, and an air quality sensor may also be included in cabin space 314 (or each occupancy zone 315) and may provide inputs to the HVAC controller 312. The outdoor ambient temperature/relative humidity sensor 198 may also provide input to the HVAC controller 312. HVAC controller 312 may also receive an indication of the ignition state of engine 310 from an ignition sensor 311. Vehicle 100 may further include a key fob sensor 341 configured to receive input from electronic key fob 340. Specifically, key fob sensor 341 may remotely couple the vehicle 100 to electronic key fob 340, thereby enabling a remote keyless entry into vehicle 100. Key fob sensor 341 may be configured to provide an indication to HVAC controller 312 regarding the locked or unlocked position of the vehicle doors.

As further described below, HVAC controller 312 may determine a vehicle condition at least partly based on the indication of one or a plurality of vehicle portal states provided by the window sensors 332, and/or, to accordingly determine whether to operate HVAC system 320, maintain the operation of HVAC system 320, or discontinue operation of HVAC system 320.

Continuing with FIG. 3, the vehicle 100 may include a climate-control interface 342 wherein environmental settings or setpoints for a level of thermal comfort desired in the cabin space may be selected. Therein, an amount of heating or cooling of the cabin space 314 may be requested. For example, a temperature setpoint (or temperature-range setpoint), $T_{sp}$, of the cabin may be selected. Additionally, a direction of air flow may be specified, for example, the air flow may be directed towards the floor of the vehicle, towards the passenger seats, other areas in the interior of the vehicle, and the like. The user may also specify a rate of air flow (for example, low, medium or high flow rates). Further, the settings may specify a ratio of fresh air (from outside the vehicle) to recirculated air (from inside the vehicle). Further still, the settings may specify the directing of the air flow towards vehicle panels for defrosting and/or defogging operations. In alternate embodiments, each occupancy zone 315 may include respective climate-control interfaces to enable each occupancy zone to be configured with respective climate-controlled zones.

HVAC controller 312 may be a microprocessor based controller including a central processing unit (CPU) and associated memory, such as read only memory (ROM), random access memory (RAM), and keep alive memory (KAM), as well as input and output ports for receiving information from, and communicating information to, the various sensors, vents, and climate-control interfaces.

HVAC controller 312 may operate HVAC system 320 in response to passenger-selected settings, for example, a temperature and direction of air flow. Specifically, in response to the passenger-selected settings, the controller may monitor and process the various inputs received from the plurality of sun load sensors 326, temperature sensors 318, window sensors 332, etc., to accordingly adjust the function of the HVAC heating and cooling components (see FIG. 4), such as the evaporator 412, the blower 408, and the heater 416, to thereby maintain the desired temperature and direction of air flow.

Figure 5:
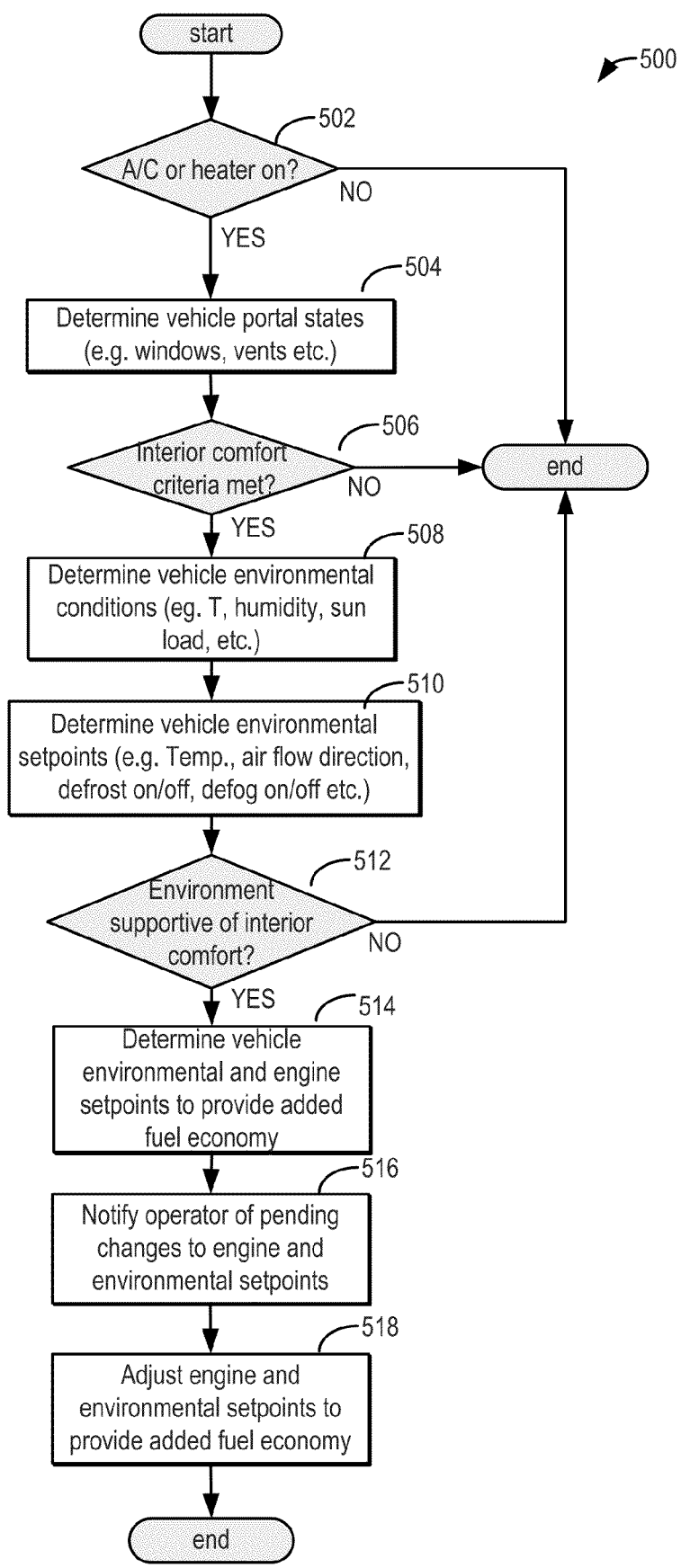
Figure 6:
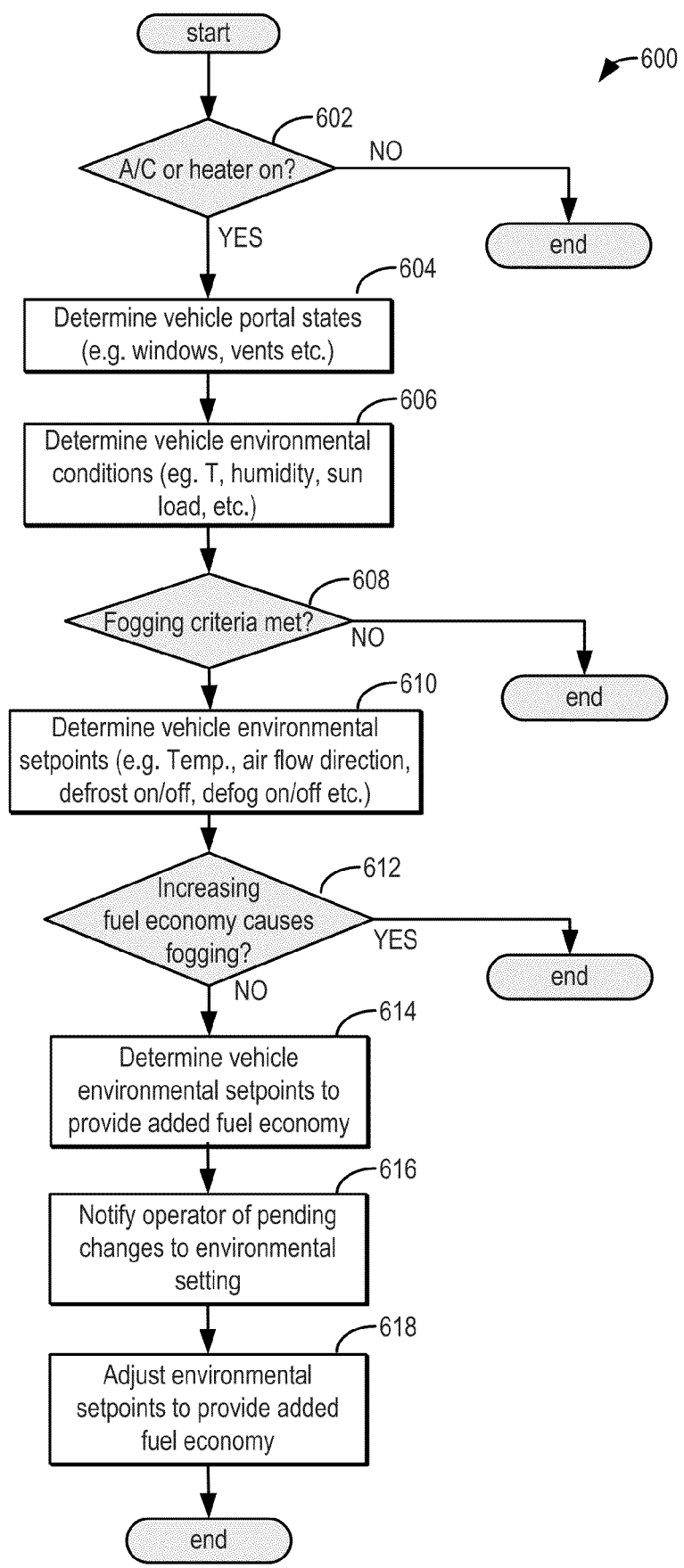

As further elaborated with reference to FIGS. 5 and 6, the HVAC controller 312 may further operate the HVAC system responsive to the thermal comfort of the users of vehicle 100 as indicated by the vehicle window sensors 332, rear window sensors, front windshield sensors, front windshield vent sensors, rear window vent sensors. For example, if the window sensors 332 in the occupied zones 315 of the cabin, as indicated by the occupancy sensors 316, indicate that the windows have been opened for several minutes, the thermal comfort of the vehicle occupants is presumed to be adequate. Accordingly, the HVAC controller can reduce the HVAC system performance, or even turn off the HVAC system heating or cooling to conserve fuel, and thus no longer maintain the user-requested settings. For example, a higher temperature than requested may be maintained. Furthermore, HVAC controller 312 may also communicate directly with vehicle control system 190, providing inputs, for example from the window sensors 332, vent sensors 325 and other sensors associated with the HVAC system 320. Vehicle control system 190 can additionally adjust the vehicle operation, for example, lowering engine speed or torque, or even shutting off the engine, in response to HVAC controller inputs to provide additional fuel economy without sacrificing passenger thermal comfort. For example, due to the limiting of the HVAC system performance, less engine output may be required, thus enabling a reduction in engine operation.

Now turning to FIG. 4, an example embodiment 400 of the components and operation of a vehicle HVAC system 320 is described. As such, the temperature and flow of air supplied to the vehicle's cabin space may be adjusted by adjusting a ratio of hot air (generated using heating elements) and cold air (generated using cooling elements). HVAC system 320 includes a fresh air duct 402 for providing fresh air from outside the vehicle, and a recirculated air duct 404 for providing recirculated air from inside the vehicle cabin. A ratio of fresh air to recirculated air is adjusted by actuator 406 responsive to selected HVAC settings. For example, when a higher proportion of recirculated air is needed, the actuator may be positioned near the mouth of fresh air duct 402 (as shown in solid lines). Alternatively, when a higher proportion of fresh air is needed, the actuator may be positioned near the mouth of recirculated air duct 404 (as shown in dotted lines). Actuator 406 may be driven between the various positions by a vacuum motor (not shown). Alternatively, actuator 406 may be driven by an electric servo motor.

The appropriate mixture of fresh and recirculated air is then passed through HVAC cooling elements, configured to enable air-conditioning. Specifically, the air is passed through blower 408 and evaporator core 412 along conduit 410. Blower 408 includes a variable speed blower motor and a blower wheel or fan. Inside evaporator core 412, the evaporation of a low pressure cooling fluid or refrigerant 434 (for example, freon) into a low pressure gas causes a cooling effect which in turn cools the air flowing across it. Based on the temperature settings of the HVAC system, a suitable proportion of cold air 414, cooled by passage through evaporator core 412, may then be passed into ducting 422 and distributed to the cabin via vents 324, front windshield vent 366 and rear window vent 338. After exiting the evaporator core, the refrigerant vapor passes through a compressor 440, emerging as a hot compressed gas. The hot compressed refrigerant gas is subsequently passed through a condenser (not shown), becoming a cooled compressed liquid, after which it is fed through an expansion valve (not shown), becoming a cold liquid/vapor mixture, before finally being reintroduced into the evaporator core 412.

Similarly, hot air 420 may be generated by passage of fresh and/or recirculated air through HVAC heating elements, configured to enable air heating. Specifically, air is passed through a heater core 416. Engine coolant 418, received from the engine, is circulated through the heater core. Heater core 416 may then behave as a heat exchanger, withdrawing heat from the engine coolant and transferring the withdrawn heat to air passing across it. In this way, hot air may be generated in conduit 430 and passed into ducting 422. A climate-controlled air flow comprising a suitable amount of hot air and cold air may be generated in ducting 422, for subsequent passage to vehicle vents. Specifically, a ratio of hot air 420 to cold air 414 may be adjusted by actuator 432 responsive to selected HVAC settings. For example, when air flow of a higher temperature is requested, the actuator may be positioned near the mouth of cold air conduit 410 (as shown in dotted lines). Alternatively, when air flow of a lower temperature is requested, the actuator may be positioned near the mouth of hot air conduit 430 (as shown in solid lines). Actuator 432 may be driven by a vacuum motor or an electric servo motor (not shown). The air flow with the requested settings of flow rate and temperature may then be directed along ducting 424, 426 and/or 428 to the vehicle floor, cabin space and panels, respectively, responsive to the passenger-indicated direction of air flow.

In this way, the heating and cooling elements of HVAC system 320 may be used to deliver an air flow with an appropriate ratio of hot and cold air to a requested location, with a requested flow rate, to thereby provide the vehicle passengers with a climate-controlled air flow.

Referring now to FIG. 5, it illustrates an example procedure 500 of adjusting the vehicle engine and motor operation, and the HVAC system 320 responsive to vehicle window and vent states using a control routine executed by HVAC controller 312 in conjunction with vehicle control system 190. Beginning at 502, the procedure evaluates whether the A/C or heater is on. In particular, it is determined if the A/C compressor is running and/or if the hot air from heat conduit 430 is being circulated to the cabin vents. At 502, inputs from vent sensors (for example vent sensor 325, 339, or 368) in one or more occupancy zones, or the position of the actuator 432 may also be received at this step. If it is determined that the air conditioning or heating is not being used, then the procedure ends. If the air conditioning or heating is on, then the procedure proceeds to step 504, where the vehicle portal states, for example the window and vent states, are determined. The window and vent states can be provided by window sensors 332 and vent sensors 325, 339 and 368 in one or more occupancy zones. Here, window state can refer to one or more of the parameters: $\delta_w$, the length of time window has been open; and $\xi_w$, the % full-open state of the window. For example, if a window is fully open, $\xi_w=100$, and if a window is closed, $\xi_w=0$. $\xi_w$ may instead refer to a cross-sectional area of the opening in the open window, the travel of the window from the fully closed position, the height of the open window, or other means for quantifying an open state of a vehicle portal. $\delta_w$ can be configured to provide the time elapsed from a change in state of a window from closed to open (and/or open to closed) in seconds, minutes, or other convenient time unit. $\delta_w$ can also refer to a ratio of elapsed duration of the time that a window is open relative to the time that a window is closed. The window state can also include the window state of a vehicle sun or moon roof, or convertible top. Furthermore, a threshold time, $\delta_{wT}$, can be defined where $\delta_{wT}$ is a pre-determined brief length of time. Accordingly, if $\delta_w$, the driver side window is opened momentarily, such as when paying a toll or ordering from a drive-thru menu, then the length of time a window is open, $\delta_w$, may be less than the threshold time $\delta_{wT}$. A threshold % full-open state of the window, $\xi_{wT}$, can similarly be defined: if a passenger inadvertently fails to close their window completely, thereby leaving it open a crack, then the % full-open state of the window, $\xi_w$, may be less than the threshold amount, $\xi_{wT}$. Threshold time, $\delta_{wT}$, and threshold % full-open state, $\xi_{wT}$, may also be used assess other changes in window or vent states. For example, the driver may momentarily close the driver side window ($\xi_w < \xi_{wT}$ for a time less than $\delta_{wT}$) to avoid odorous exhaust from a passing vehicle. Vent states can include whether the vents in one or more occupancy zones are open or closed and also the time that the one or more vents have been in the open or closed state. Vent states can also include the airflow through the vents, which may further include the % full-open of one or more vents, the air flow through the one or more vents indicated by the blower speed, and/or the number of open vents in one or more occupancy zones. A lower threshold blower speed, $B_{spdLT}$, and an upper threshold blower speed, $B_{spdUT}$, can also be defined. If there is a large discrepancy between the cabin temperature and the setpoint cabin temperature, the blower speed may be set higher than $B_{spdUT}$ in order to expeditiously cool the cabin. Conversely, if the cabin temperature is very close to the setpoint cabin temperature, the blower speed may be set at a low level, lower than $B_{spdLT}$.

TABLE 1

Portal Conditions for Evaluating Interior Comfort Criteria

| Case | Portal | Portal State | Opening | Duration | Interior Comfort | Favor Fuel |
|---|---|---|---|---|---|---|
| 1 | Driver window | Open | $>\xi_{wT}$ | $>\delta_{wT}$ | Yes | Yes |
| 2 | Driver window | Momentary open | $>\xi_{wT}$ | $<\delta_{wT}$ | Depends | Depends |
| 3 | Driver window | Closed | $<\xi_{wT}$ | | No | Yes |
| 4 | Non-driver | Open | $>\xi_{wT}$ | $>\delta_{wT}$ | Depends | Depends |
| 5 | Non-driver | Momentary open | $>\xi_{wT}$ | $<\delta_{wT}$ | No | Yes |
| 6 | Non-driver | Closed | $<\xi_{wT}$ | | No | Yes |
| 7 | Multiple | Open | $\Sigma(\xi_w)_i > \xi_{wT}$ | $f(\delta_w)_i > \delta_{wT}$ | Yes | Yes |
| 8 | Multiple | Momentary open | $\Sigma(\xi_w)_i > \xi_{wT}$ | $f(\delta_w)_i < \delta_{wT}$ | Depends | Depends |

TABLE 1-continued

Portal Conditions for Evaluating Interior Comfort Criteria

| Case | Portal | Portal State | Opening | Duration | Interior Comfort | Favor Fuel |
|---|---|---|---|---|---|---|
| 9 | Multiple | Closed | $\Sigma(\xi_w)_i > \xi_{wT}$ | | No | Yes |
| 10 | Multiple | $i^{th}$ zone open | $(\xi_w)_i > \xi_{wT}$ | $(\delta_w)_i > \delta_{wT}$ | Yes | Yes |
| 11 | Multiple | $i^{th}$ zone | $(\xi_w)_i > \xi_{wT}$ | $(\delta_w)_i < \delta_{wT}$ | Depends | Depends |
| 12 | Multiple | $i^{th}$ zone closed | $(\xi_w)_i > \xi_{wT}$ | | No | Yes |
| 13 | Convertible | Open | Open | $>\delta_{wT}$ | Yes | Yes |
| 14 | Convertible | Open | Open | $<\delta_{wT}$ | Depends | Depends |
| 15 | Convertible | Closed | Closed | | No | Yes |
| 16 | Sun roof/ | Open | Open | $>\delta_{wT}$ | Yes | Yes |
| 17 | Sun roof/ | Open | Open | $<\delta_{wT}$ | Depends | Depends |
| 18 | Sun roof/ | Closed | Closed | | No | Yes |
| 19 | Other large | Open | Open | $>\delta_{wT}$ | Yes | Yes |
| 20 | Other large | Open | Open | $<\delta_{wT}$ | No | Yes |
| 21 | Other large | Closed | Closed | | No | Yes |

TABLE 2

Blower Conditions for Evaluating Interior Comfort Criteria

| Case | Blower speed | Duration | Interior comfort criteria met? | Favor fuel economy? |
|---|---|---|---|---|
| 21 | Increased or decreased | | No | No |
| 22 | $<B_{spdLT}$ | $>\delta_{BT}$ | Yes | Yes |
| 23 | $<B_{spdLT}$ | $<\delta_{BT}$ | Yes | Yes |
| 24 | $>B_{spdUT}$ | $>\delta_{BT}$ | Depends | Depends |
| 25 | $>B_{spdUT}$ | $<\delta_{BT}$ | No | No |

Continuing with procedure 500, at 506, the procedure assesses the thermal comfort of the passengers by determining if interior comfort criteria are satisfied. The interior comfort criteria can comprise one or a plurality of window and vent states from the various occupancy zones. Table 1 illustrates example cases of different vehicle portal states, indicating whether or not the interior comfort criteria are satisfied for each case. For example, if three passenger windows are open for a time greater than $\delta_{wT}$ and an amount greater than $\xi_{wT}$, then the interior comfort criteria may be satisfied (Table 1, case 7). In Table 1, case 7, the interior comfort criteria may be satisfied if the sum of their openings $\Sigma(\xi_w)_i$ is greater than $\xi_{wT}$, and if their open duration satisfies $f(\delta_w)_i > \delta_{wT}$, where $f(\delta_w)_i$ can be a preset function of $\delta_{wi}$, for example the sum of each $\delta_{wi}$, $\Sigma(\delta_w)_i$. As a further example, if the driver is the only passenger in the vehicle (indicated by occupancy sensors 316), and the driver window is open for a time greater than $\delta_{wT}$ and an amount greater than $\xi_{wT}$, the interior comfort criteria may be satisfied (Table 1, case 1). In some instances, the cases do not determine if the conditions are met, as they may depend on still additional factors.

Table 2 illustrates example cases of different blower speed conditions, indicating whether or not the interior comfort criteria may be satisfied for each case. As a further example, if the airflow through one or a plurality of cabin vents is reduced, for example by reducing the vent openings or reducing the blower speed below a lower threshold blower speed, $B_{spdLT}$, the interior comfort criteria may be satisfied (Table 2, case 22 and case 23). Conversely, if the blower speed is increased above an upper threshold blower speed, $B_{spdUT}$, for less than a threshold blower time, $\delta_{BT}$, the interior comfort criteria may not be satisfied (Table 2, case 25). As such, the interior comfort criteria may be satisfied by a single window or vent state or by a plurality of window and/or vent states. In some cases, a plurality of interior comfort criteria can exist from one or more occupancy zones. For example, a first window or vent state may meet the interior comfort criteria for its corresponding first occupancy zone while a second window or vent state may not meet the interior comfort criteria for its corresponding second occupancy zone. As such, the HVAC controller 312 may adjust the environmental conditions in the first occupancy zone, but may not adjust the environmental conditions in the second occupancy zone, and this information can be input to the vehicle control system 190. Furthermore, as shown in Table 1, the interior comfort criteria for each portal type may be different. For example, if a convertible top is open for any amount of time, the interior comfort criteria may be satisfied. The occupancy sensors may also be utilized in assessing the thermal comfort of the passengers. For example, if the driver is the sole passenger of the vehicle, then procedure 500 may ignore the vent states in the rear occupancy zones of the vehicle when evaluating the interior comfort criteria. However, the rear and rear side window states may still be taken into account when evaluating the thermal comfort of the driver, since ambient airflow into the vehicle through the rear windows can influence the interior comfort of the cabin in other occupancy zones due to convection and mixing of the entering ambient airflow throughout the vehicle cabin.

Continuing with Table 1, in some cases, in addition to portal states, the interior comfort criteria may further depend on climate control settings (environmental setpoints) and ambient environmental conditions. For instance, in Table 1, case 4, if a non-driver window is open with an opening $\xi_w > \xi_{wT}$ for a duration $\delta_w > \delta_{wT}$, the interior comfort criteria may be satisfied only if further climate control setpoints relative to the current ambient conditions are satisfied. For example, if the climate control setpoints are not supported by directing ambient airflow into the vehicle cabin, then the interior comfort criteria may not be satisfied. For example, if the cabin temperature is 67° F. and the cabin temperature setpoint is 70° F., but the ambient air temperature outside the vehicle is 65° F., then the interior comfort criteria may not be satisfied. In such cases climate control (via the HVAC controller 312) to provide thermal comfort may be given priority over operation of the vehicle to provide additional fuel economy. Furthermore, if the difference between the ambient conditions and climate control environmental setpoints are extreme, and directing ambient airflow into the cabin would not support climate control, interior comfort criteria may not be satisfied regardless of the portal state. In other cases, the portal state may not provide a clear indication of interior comfort. For example, in Table 1, case 3, although a driver's thermal comfort may be adequate, the driver may not open the driver window or provide other clear indication to the HVAC control system that interior comfort criteria are satisfied. In such cases, the procedure 500 may interpret the vehicle portal states as satisfying interior comfort criteria, and thereby favor operating the vehicle to provide additional fuel economy.

Continuing at 506, the interior comfort criteria can further comprise changes in blower speed. For example, if the blower speed is decreased, the interior comfort criteria may be satisfied. Furthermore, if the blower speed is reduced below a lower blower speed threshold, $B_{spdLT}$, for a time greater than a blower threshold time, then the interior comfort criteria may be satisfied (Table 2, cases 22 and 23). Conversely, in Table 2, case 25, where the blower speed is above an upper blower speed threshold, $B_{spdUT}$, for a time less than a blower time threshold $\delta_{BT}$, the interior comfort criteria may not be satisfied. As described above, under certain conditions, the interior comfort criteria can also comprise criteria related to the ambient environmental conditions and climate control environmental setpoints, in addition to vehicle portal state heuristics.

Continuing at 506, if the interior comfort criteria are not satisfied then procedure 500 ends. Otherwise, if the interior comfort criteria are satisfied, then the procedure continues at 508.

At 508, the current vehicle environmental conditions are determined from various sensors throughout the vehicle. The vehicle environmental conditions can include outdoor ambient temperature, altitude, wind speed, indoor cabin temperature, relative humidity, fogging, sun load, front and rear windshield wiper state, and the like. Environmental conditions can be determined at each occupancy zone within the vehicle cabin.

Next, at step 510, the current vehicle environmental setpoints are determined. The environmental setpoints can comprise interior cabin temperatures, humidity, blower speed, vent position, vent directions, and the like, for the overall cabin and/or for individual occupancy zones.

Continuing at 512 the current vehicle environmental conditions are compared with the current vehicle environmental setpoints to determine if the environment is supportive of providing interior comfort. The current vehicle environmental setpoints may be previously input by the user at climate control interface 342. For example, if the ambient temperature is 64° F., the interior cabin temperature is 80° F., and the interior cabin temperature setpoint is 68° F., then the environment is supportive of interior comfort. Accordingly, opening the windows or vents to allow ambient air into the vehicle would support cooling of the interior cabin temperature to reach the temperature setpoint. As a further example, if the interior cabin relative humidity is 30%, the interior cabin relative humidity setpoint is 20%, and the windshield wipers are on (e.g. it is raining) and/or the exterior ambient relative humidity is determined to be 50%, the environment is not supportive of interior comfort because opening the windows or vents to allow ambient air inside the cabin would raise the interior cabin humidity away from the setpoint. Still a further example includes determining whether the environment is supportive of interior comfort when opening a sunroof or a convertible top; in this case, if the sun load sensors indicate a high sun load, opening a sunroof or convertible top may not be supportive to cooling the cabin environment. If the current vehicle environmental conditions are not supportive of interior comfort, then procedure 500 ends. Otherwise, procedure 500 continues at 514.

At 514, new vehicle environmental and engine setpoints are determined to provide additional fuel economy. Because the current vehicle environmental conditions are supportive of thermal comfort, the HVAC controller 312 can adjust the HVAC system setpoints to reduce the performance of the HVAC system. Interior thermal comfort of the passengers can still be maintained because the open windows or vents can allow ambient air into the vehicle to augment the performance of the HVAC system. In determining the new vehicle and environmental and engine setpoints, the HVAC controller 312 and the vehicle control system 190 may account for the current driving conditions. For instance, if the driving speeds are high (for example, 50 mph or more), then it may be too windy and noisy to open the windows; however one or more vents may be fully opened to allow ambient air into the cabin. Accordingly, the HVAC controller 312 may only slightly adjust the vehicle environmental setpoints. The HVAC controller 312 and vehicle control system 190 may also account for the magnitude of the difference between the current vehicle environmental conditions and vehicle environmental setpoints. For example, if the outdoor ambient air temperature is only a few degrees different from the interior cabin temperature, then opening the windows and/or vents may not have a significant impact on the interior comfort of the passengers. As such, the HVAC controller 312 may only adjust the cabin temperature setpoint by a slight amount as compared to a case where the ambient temperature is several degrees cooler than the interior cabin temperature. As a further example, for the case where the ambient temperature is several degrees cooler than the interior cabin temperature, the HVAC controller 312 may shut off the A/C compressor 440 since adequate cooling can be provided by directing ambient airflow into the cabin. Other types of setpoint adjustments that can be made by the HVAC controller include lowering blower speed, increasing a temperature above the cabin temperature setpoint, $T_{sp}$, at which the A/C compressor 440 may be automatically turned on, lowering the compressor pressure, limiting the A/C or heating performance, suppressing A/C clutch activation, and the like. For example, if the convertible top is retracted, providing ample cooling to the cabin as compared to when the convertible top was previously closed, the HVAC controller 312 may limit the climate control system performance by raising the temperature setpoint several degrees or by reducing the air conditioning compressor pressure and/or speed. In a further example, if the driver window is open greater than a threshold open criteria (e.g. $\delta\omega > \delta\omega_T$ and $\xi\omega > \xi\omega_T$), providing cooling to the passenger cabin, the HVAC controller 312 may limit the climate control system performance by reducing the A/C blower speed compared to a blower speed providing a user-requested level of thermal comfort. For instance, the HVAC controller 312 may reduce the blower speed from a high speed setting to a medium speed setting, or from a high speed setting to a low speed setting. The magnitude of the blower speed reduction effected by the HVAC controller 312 may depend on the relative differences in outdoor ambient and interior cabin temperatures. For instance, if the outdoor temperature is only slightly cooler than the cabin temperature, the blower speed may only be slightly reduced (e.g. from a high speed to a medium-high speed). Conversely, if the outdoor temperature is only significantly cooler than the cabin temperature, the blower speed may be reduced by a larger amount (e.g. from a high speed to a low speed).

Continuing at 514, the vehicle control system 190, responsive to the setpoint changes made by the HVAC controller 312, can adjust the engine operating setpoints to favor providing additional fuel economy (Table 1, last column). Owing to the reduced HVAC system 320 performance requirements for maintaining passenger thermal comfort, the electrical load requirements for operating the HVAC system 320 are lowered. As such, the electrical energy generation requirements for maintaining vehicle operation by the motor 120 via engine 110, and the electrical energy storage requirements at energy storage device 150 are reduced. Consequently, the engine operation can be biased towards providing additional fuel economy by reducing the engine operating setpoints, for example, by reducing the engine speed or rpm, setting transmission to a higher gear ratio for lower torque, reducing engine torque supporting front end accessory drive system loading and/or the electrical bus, or by shutting the engine off.

Next, procedure 500 continues at 516, where the operator is notified of pending changes to the engine and environmental setpoints. The notification may be displayed, for example, at climate control interface 342 and/or message center 196. In some embodiments, the operator may be asked to confirm or approve the changes to the engine and environmental setpoints; if confirmation or approval is not provided, the procedure 500 ends. Otherwise, at 518, the engine and environmental setpoints are adjusted at 518 by the vehicle control system 190 and the HVAC controller 312 respectively to provide additional fuel economy. After executing step 518, procedure 500 ends.

In this manner, procedure 500 describes an example embodiment of a procedure of operating an HVAC system 320 of a PHEV 100, comprising during a first engine-running condition, where a vehicle window or vent is in a more closed position, operating the HVAC system to provide a user requested level of thermal comfort, and during a second engine-running condition, wherein the vehicle window or vent is in an open position (e.g. less closed position), and having an open vehicle window or vent state satisfying an interior comfort criteria, limiting the HVAC system performance and biasing shared vehicle resources to provide additional fuel economy.

Referring now to FIG. 6, it illustrates another example procedure 600 of adjusting the vehicle engine and motor operation, and the HVAC system 320 responsive to vehicle window and vent states using a control routine executed by HVAC controller 312 in conjunction with vehicle control system 190. Procedure 600 is similar to procedure 500, but further comprises during a third engine-running condition, wherein fogging criteria are satisfied, limiting the climate control system performance and biasing shared vehicle resources so as not to induce fogging of a vehicle windshield. As such, procedure 600 assesses if adjusting environmental setpoints to limit the climate control system performance will result in fogging of the windows. If fogging is likely to occur upon adjusting environmental setpoints, the environmental and engine setpoints are not adjusted to provide additional fuel economy.

Procedure 600 begins at 602 and 604 which are executed in the same manner as described above for steps 502 and 504 respectively in procedure 500. Next procedure 600 determines the vehicle environmental conditions at 606, in the same manner as described above for step 508 in procedure 500. Once the vehicle environmental conditions are determined, procedure 600 continues to step 608 where it is determined if the current vehicle environmental conditions satisfy fogging criteria, indicating that fogging of one or more windows is likely to occur. For example, the outdoor ambient temperature sensor 198 and vehicle window sensors 332 can be used to determine the ambient and vehicle cabin temperatures and relative humidity. Procedure 600 can subsequently perform dew point calculations, for example, at the interior surfaces of windows 328 or front windshield 360, or rear window 330, to assess if fogging of the windows or windshield is likely to occur. Step 608 further comprises determining if opening vehicle portals (e.g. windows 328 or vents 324, 338) to allow ambient air inside the cabin would support defogging as additional fogging criteria. If the environmental conditions are conducive to fogging and if opening the windows or vents would support defogging, then the fogging criteria may be satisfied, and procedure 600 continues to step 610. If fogging criteria are not satisfied, then procedure 600 ends.

Continuing with FIG. 6 at 610, procedure 600 determines the current vehicle environmental setpoints in the same manner as described above for step 510 in procedure 500. Next, procedure 600 at step 612 determines if adjusting climate control to reduce HVAC system performance and provide added fuel economy may cause fogging of the windows. For example, if the dewpoint temperature is very close to the interior cabin and exterior ambient temperatures, and if the exterior relative humidity is very high (e.g. it is raining), then the front windshield may be likely to fog if the HVAC system performance is reduced, even if one or more windows or vents are opened. For the case where reducing HVAC system performance and providing added fuel economy may likely induce fogging, procedure 600 ends. In some cases, the HVAC system performance can be slightly reduced without inducing fogging, to provide additional fuel economy. Otherwise, procedure 600 continues to step 614 where new vehicle environmental and engine setpoints may be determined. Subsequently at 616, the operator may be notified of, and can provide confirmation for, pending changes to the vehicle environmental setpoints via control center interface 342 or message center 196. Finally, at 618, the environmental and engine setpoints are adjusted to provide additional fuel economy. Steps 614, 616, and 618 are executed in the same manner as described above for steps 514, 516, and 518 of procedure 500. After executing step 618, procedure 600 ends.

An example scenario can be used to illustrate the execution of methods 500 and 600 during vehicle operation. For example, a vehicle can be operated during engine-running conditions, wherein a vehicle portal (e.g. windows 328 and/or vents 324) is closed, and wherein the HVAC controller 312 maintains a user-requested level of thermal comfort via the climate control system. For example, the HVAC controller 312 may adjust the A/C compressor speed and/or pressure, blower speeds, and vent airflow directions as needed to maintain the user-requested cabin temperature and/or humidity setpoints. During other engine-running conditions, wherein a vehicle portal is open (e.g. a window 328 is open greater than a threshold open criteria), and wherein vehicle environmental sensors determine that fogging is unlikely, the HVAC controller 312 may adjust the environmental setpoints of the climate control system, executing a first, larger reduction in the performance of the climate control system, thereby maintaining less than the user-requested thermal comfort level. For example, during an engine-running condition, if the driver window is open greater than a threshold open criteria (e.g. Table 1, case 1, $\delta\omega > \delta\omega_T$ and $\xi\omega > \xi\omega_T$) and fogging is unlikely (e.g. the vehicle temperature and humidity sensors determine that the cabin temperature is several degrees higher than the dewpoint temperature), the HVAC controller 312 may shut off the vehicle air conditioning. Accordingly, the vehicle control system 190 may bias shared resources of the vehicle to provide additional fuel economy, including for example, shutting the engine off. Furthermore, during engine-running conditions wherein a vehicle portal is open (e.g. a vent 324 is open greater than a threshold open criteria), and wherein vehicle environmental sensors determine that fogging is likely, the HVAC controller 312 may adjust the environmental setpoints of the climate control system, executing a second, smaller reduction in the performance of the climate control system, thereby maintaining less than the user-requested thermal comfort level. For example, during an engine-running condition, the vents 324 may be fully open, and the blower may circulate ambient air at a blower speed satisfying the interior comfort criteria (e.g. Table 2, case 22, $B_{spd}<B_{spdLT}$ and $\delta_B>\delta_{BT}$). However, because it is raining (as indicated, for example, by outdoor ambient relative humidity sensor 198, and/or wiper sensor 364), fogging is likely. Accordingly, HVAC controller 312 may raise the temperature setpoint of the climate control system by 1° F. Owing to the high likelihood of fogging, a larger reduction in climate control system performance (e.g. shutting of the air conditioning or raising the temperature setpoint by several degrees) may not be executed, in order to avoid fogging. Accordingly, the vehicle control system 190 may bias shared resources of the vehicle to provide additional fuel economy, including for example, by reducing in engine torque and/or rpm setpoints.

Consequently, during engine-running conditions where a vehicle portal is open greater than a threshold open criteria and fogging is likely, climate control system performance limitations effected by the HVAC controller 312 may be less severe, to avoid fogging, as compared to climate control system performance limitations effected by the HVAC controller 312 where a vehicle portal is open greater than a threshold open criteria and fogging is unlikely. Accordingly, during engine-running conditions where a vehicle portal is open greater than a threshold open criteria, fogging is unlikely, and the climate control system performance is limited to maintain less than a user-requested thermal comfort level, shared vehicle resources may be biased to a greater degree providing greater gains in fuel economy as compared to engine-running conditions where a vehicle portal is open greater than a threshold open criteria, fogging is likely, and the climate control system performance is limited to maintain less than a user-requested thermal comfort level.

Note that the example routines described herein can be used with various engine and/or vehicle system configurations. The routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily called for to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to various vehicle types, such as hybrid, plug-in hybrid, non-hybrid, and the like. Further, portal opening indications can be based on various parameters, such as a window-open sensor, a window open switch position sensor, and/or others. The subject matter of the present disclosure includes all novel and non-obvious combinations and sub-combinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims are to be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a plug-in hybrid-electric vehicle, comprising:
during a first engine-running condition, including when a vehicle window or vent is in a more closed position, operating a climate control system to provide a user-requested level of thermal comfort, wherein the more closed position comprises the vehicle window or vent being open:
less than a threshold opening amount, or
being open less than a threshold time; and
during a second engine-running condition, including when the vehicle window or vent is in a less closed position, limiting a performance of the climate control system relative to the performance of the climate control system during the first engine-running condition, wherein the less closed position comprises the vehicle window or vent being open greater than the threshold opening amount for greater than the threshold time.

2. The method of claim 1, wherein during the second engine-running condition, operation of shared vehicle resources are biased relative to the operation of shared vehicle resources during the first engine-running condition to provide additional fuel economy.

3. The method of claim 2, wherein biasing operation of shared resources includes one or more of:
reducing engine rpm relative to the engine rpm during the first engine-running condition and
suppressing an air-conditioning clutch activation ratio relative to the clutch activation ratio during the first engine-running condition.

4. The method of claim 3, wherein during the second engine-running condition, the performance of the climate control system is limited in one or a plurality of vehicle occupancy zones corresponding to where the vehicle window or vent is in the less closed position, and wherein the performance of the climate control system is not limited in one or a plurality of vehicle occupancy zones corresponding to where the more closed position, wherein the less closed position comprises the vehicle window or vent being open greater than the threshold opening amount for greater than the threshold time.

5. The method of claim 1, wherein limiting the performance of the climate control system comprises reducing a blower speed compared to a blower speed that provides the user-requested level of thermal comfort during the first engine-running condition.

6. The method of claim 1, wherein limiting the performance of the climate control system comprises adjusting thresholds for automatically starting and stopping a compressor to reduce compressor load as compared to a compressor load that provides the user-requested level of thermal comfort during the first engine-running condition.

7. The method of claim 1, wherein
the first engine-running condition further comprises when an ambient relative humidity is greater than a vehicle cabin relative humidity, and
the second engine-running condition further comprises when the ambient relative humidity is less than the vehicle cabin relative humidity.

8. The method of claim 1, further comprising:
during a third engine-running condition, including when a blower speed is greater than an upper threshold blower speed for less than a threshold blower time, operating the climate control system to provide the user-requested level of thermal comfort; and
during a fourth engine-running condition, including when the blower speed is less than a lower threshold blower speed, limiting the performance of the climate control system.

9. The method of claim 8, wherein during the second engine-running condition, the performance of the climate control system is limited by a greater amount when a difference between outdoor ambient and interior cabin environmental conditions is larger, and the performance of the climate control system is limited by a lesser amount when a difference between the outdoor ambient and interior cabin environmental conditions is smaller.

10. The method of claim 1, wherein during the second engine-running condition, the performance of the climate control system is limited in a vehicle occupancy zone corresponding to where the vehicle window or vent is in the less closed position.

11. The method of claim 1, wherein during the second engine-running condition, the performance of the climate control system is limited in a driver zone when a rear side window or vent is in the less closed position.

12. The method of claim 1, wherein the second engine-running condition further comprises when climate control setpoints are supported by directing ambient airflow into a vehicle cabin.

13. The method of claim 1, wherein the vehicle window or vent comprises a vehicle window.

14. The method of claim 1, wherein the vehicle window or vent comprises one of a sunroof and a moonroof.

15. A vehicle method, comprising,
during engine operation:
operating an air conditioner compressor via engine output, the compressor operated at a requested level when a window is open less than a threshold amount or a threshold time; and
operating the air conditioner compressor at a reduced level below the requested level when the window is open more than the threshold amount for longer than the threshold time.

16. The method of claim 15, further comprising operating the air conditioner compressor at the reduced level when fogging is unlikely, and operating the air conditioner compressor between the reduced and requested levels when fogging is likely.

* * * * *